United States Patent [19]

Saeman

[11] 4,118,524

[45] * Oct. 3, 1978

[54] GRANULAR CALCIUM HYPOCHLORITE BY SPRAY GRAINING

[75] Inventor: Walter C. Saeman, Hamden, Conn.

[73] Assignee: Olin Corporation, New Haven, Conn.

[*] Notice: The portion of the term of this patent subsequent to Jul. 13, 1993, has been disclaimed.

[21] Appl. No.: 735,575

[22] Filed: Oct. 26, 1976

Related U.S. Application Data

[60] Division of Ser. No. 521,417, Nov. 6, 1974, abandoned, which is a continuation-in-part of Ser. No. 276,615, Jul. 31, 1972, abandoned.

[51] Int. Cl.² ............................................. C01B 11/06
[52] U.S. Cl. .................................. 427/213; 427/215; 252/187 H
[58] Field of Search ............................. 427/215, 213; 252/187 H; 23/313; 423/474

[56] References Cited

U.S. PATENT DOCUMENTS

| | | | |
|---|---|---|---|
| 2,195,756 | 4/1940 | Taylor | 23/313 |
| 3,761,549 | 9/1973 | Marshall | 264/15 |
| 3,844,726 | 10/1974 | Denaeyer | 23/302 X |
| 3,953,354 | 4/1976 | Faust | 252/187 H |
| 3,969,546 | 7/1976 | Saeman | 427/213 |

*Primary Examiner*—Ronald H. Smith
*Assistant Examiner*—Sam Silverberg
*Attorney, Agent, or Firm*—Donald F. Clements; James B. Haglind

[57] ABSTRACT

Granular calcium hypochlorite particles having a core of calcium hypochlorite encapsulated in a plurality of layers of calcium hypochlorite are produced from an aqueous slurry of calcium hypochlorite by spraying a pumpable and sprayable slurry of calcium hypochlorite particles onto suspended particles of solid calcium hypochlorite above a moving bed of said particles. The solid particles coated with the slurry are heated to simultaneously evaporate and remove water from the slurry whereby said particles are coated with a layer of solid calcium hypochlorite.

A portion of the moving bed of coated articles is removed from the spraying zone and further processed, if desired. In one embodiment the coated articles, with or without sizing, are dried to produce granular particles having the desired moisture content. In another embodiment, the withdrawn portion is conveyed to another spraying zone where the articles are coated wth a slurry of calcium hypochlorite having a lower available chlorine content than the particles which form the core material. In another embodiment, the withdrawn portion of calcium hypochlorite particles is conveyed to another spraying zone where the particles are coated with a plurality of layers of an inorganic salt.

The resulting coated or layered granular particles of calcium hypochlorite have a high level of integrity and resist degradation and dusting when subjected to rather severe handling conditions. In addition, the novel granular calcium hypochlorite particles of this invention are highly stable when contacted wth lighted cigarettes, organic materials and the like.

12 Claims, 6 Drawing Figures

GRANULAR CALCIUM HYPOCHLORITE BY SPRAY GRAINING

This is a division of application Ser. No. 521,417, filed Nov. 6, 1974, now abondoned, which is a continuation-in-part application of co-pending application Ser. No. 276,615, filed July 31, 1972, now abandoned.

This invention relates to granular calcium hypochlorite particles which resist dusting and degradation during handling, and which are highly stable when contacted with lighted cigarettes or organic materials.

In most methods for the commercial manufacture of calcium hypochlorite a slurry is obtained containing crystals of calcium hypochlorite dihydrate in a cool aqueous solution of calcium hypochlorite and sodium chloride or other inorganic halide. The slurry is filtered to produce a cake containing from about 42 to about 48 percent by weight of water. When this cake is dried, a very light, porous cake is obtained which breaks down to an undesirable fine, dusty powder. The crystals in the cake lack a natural cohesive tendency. If the filter cake is compressed, the resulting cake is harder but fragments into flaky granules with fragile edges. These are easily abraded and form an unsatisfactory, dusty product. Thus, the wet cake has been partially dried, compressed into a sheet between heavy rolls which is broken up and further dried as in U.S. Pat. No. 2,195,754, which issued April, 1940 to H. L. Robson et al. This product has a highly irregular shape with fragile edges and will break down into a fine dust when crushed or submitted to severe handling conditions.

U.S. Pat. No. 2,195,756, which issued Apr. 2, 1940 to Maurice C. Taylor, describes a process for preparing calcium hypochlorite particles by admixing the wet cake of calcium hypochlorite in a cutting type mixer with dry fines in sufficient proportion to decrease the water content from the 42 to 48 percent level down to about the 20 to 30 percent level. No water is evaporated during this mixing step, but instead the moist particles are dried in a separate step under carefully controlled conditions to avoid any substantial crushing of the material. Granule compression pressures are less in the mixer than by rolls and Taylor's granules are therefore softer. Although granular material is produced by this technique, the integrity of the granular particles is not strong enough to resist dusting when subjected to severe handling conditions.

Similar granulation techniques are described in U.S. Pat. Nos. 2,195,755 and 2,195,757, which issued to Homer L. Robson et al on Apr. 2, 1940. In each of these granulation techniques, care must be taken to dry the granulated material under conditions which avoid substantial crushing or abrasion. The problem with the products of these techniques is that excessive dusting occurs when the product is dried under severely agitated conditions.

In each of the four above-described calcium hypochlorite granulation techniques, drying is carried out under gentle handling conditions in a rotary vacuum dryer or the Wyssmont type tray dryer, which is commonly used to minimize dust formation and entrainment in the drying atmosphere. Drying rates in these types of driers are relatively slow. Because of the sensitivity of calcium hypochlorite to thermal degradation, the losses of active hypochlorite are relatively high in these types of dryers.

In the process of U.S. Pat. No. 2,347,402, which issued on Apr. 25, 1944 to George Gerald Day, a plastic and unsprayable slurry of calcium hypochlorite is subjected simultaneously to evaporation and agitation until the water content is from about 25 to 35 percent and the solids form loosely bonded aggregates. The drying of the above-described product preferably takes place while the product is maintained in a relative quiescent condition, i.e. with little or no agitation until the moisture content is reduced to about 2 percent or less.

U.S. Pat. No. 2,901,435 which issued to H. L. Robson on Aug. 25, 1959, discloses spray-drying of calcium hypochlorite slurries to avoid filtration and drying problems and to minimize loss of hypochlorite by reduction of the drying time. However, the product is hollow, highly porous particles of low density which cannot withstand severe handling conditions without severe dusting.

The spray graining technique has been used to prepare granular solids from various aqueous solutions and aqueous slurries. For example, British Pat. No. 576,557 relates to the dehydration of aluminum sulfate by spraying a solution thereof onto a rotating bed of preformed crystals at a temperature from about 80° C. to about 95° C. (176°–203° F.) while passing hot gases in contact with the solid to remove water. Due to its high viscosity and tendency to form hydrated salts, aluminum sulfate solutions cannot readily be concentrated beyond a 50 percent to 60 percent by weight of $Al_2(SO_4)_3$. It is not subject to thermal degradation hence relatively high temperatures and long retention time can be used to volatilize water from the granular solid. In addition, U.S. Pat. No. 2,926,079, which issued to B. G. Smith on Feb. 23, 1960, relates to the production of fertilizer pellets by spraying a slurry of fertilizer solids onto a shower of individualized fertilizer particles in a stream of hot gases in a flighted granulator. Fertilizers solids are usually clay-like in texture with good cohesive properties. Therefore, they can be easily bonded into granules in a moist condition. Bonding moisture is also easily removed at elevated temperatures over suitable periods of time because fertilizer salts still have good thermal stability at temperatures which induce rapid volatilization of water. Screening, crushing and recycling of the solid particles are disclosed by Smith.

Canadian Pat. No. 592,240, which issued Feb. 9, 1960, discloses spraying ammonium sulfate solutions onto a shower of crystals in a rotary grainer. Rigid crystalline materials of this type are readily formed into granular particles of high integrity in such a process. Ammonium sulfate is a fertilizer salt of sufficient thermal stability to permit water volatilization at high temperatures over long periods of time.

In contrast to the foregoing cases, calcium hypochlorite is subject to rapid chemical decomposition in the presence of moisture at temperatures only slightly in excess of ambient room temperatures. The experimentally measured decomposition rate at 30° C. for a slurry of calcium hypochlorite in water was 1 percent loss of active chlorine per hour. For every 10° C. elevation in slurry temperature, the decomposition rate doubles approximately and reaches about 4 percent per hour at 50° C. At 90° C. — a temperature still below the boiling point of water — the decomposition rate exceed 50 percent per hour. Thermal stability of calcium hypochlorite improves as the water content is reduced. Thus, anhydrous calcium hypochlorite has good stability even at temperatures near 100° C. Stability improvement becomes more rapid as water is reduced below about 17 percent at which point residual moisture exists mainly as the water of hydration of the dihydrate of calcium hypochlorite. In view of this interrelation of hypochlorite stability with moisture and temperature, water removal must be rapid and at a low temperature to minimize the degradation of the product during the granulation and drying steps of the process. Also, since crystals in hypochlorite slurry are very weak in cohesive tendency as supported by earlier patent art cited above, this rapid, low-temperature drying must also be done under circumstances where sufficient cohesive bonding is induced in the granule to form smooth, rounded hard grains not easily subject to breakage or abrasion during the normal handling of the product in commerce.

There is a need at the present time for improved calcium hypochlorite granules which have a high level of integrity and resist dusting when subjected to severe handling conditons.

It is a primary object of this invention to provide improved granular calcium hypochlorite particles which have a high level of integrity and resist dusting when subjected to crushing under severe handling conditions.

Another object of this invention is to provide an improved method for producing a novel granular calcium hypochlorite material having a high level of integrity which resists crushing when subjected to severe handling conditions.

It is another object of this invention to provide an improved method for recovering calcium hypochlorite from aqueous slurries thereof to produce a particulate product of controlled size, available chlorine content and moisture content.

A further object of this invention is to provide a method for producing calcium hypochlorite from aqueous slurries thereof at relatively low reaction and drying temperatures to produce a particulate product with reduced losses of available chlorine caused by decomposition.

It is another object of this invention to provide a process for accelerating the volatilization of water from moist and hydrated calcium hypochlorite at relatively low temperatures to reduce the quantity of calcium hypochlorite present in process equipment and thus minimize potential manufacturing hazards which could result from accidental ignition and decomposition of this material.

Another object of the invention is to provide a method for producing smooth-surfaced, rounded granular calcium hypochlorite particles free of sharp, fragile edges which are subject to abrasion and dust formation during handling.

Still another object of this invention is to provide novel granular calcium hypochlorite particles having an inner portion of calcium hypochlorite and an outer portion of a different calcium hypochlorite with a different available chlorine concentration or different moisture content and a process for producing them.

It is another object of this invention to provide novel granular calcium hypochlorite particles having an inner portion of calcium hypochlorite coated with an outer portion of an inorganic salt other than calcium hypochlorite.

These and other objects of the invention will be apparent from the following detailed description of the invention.

The novel composition of this invention is a rounded granular calcium hypochlorite comprised of a core of calcium hypochlorite encapsulated with a plurality of rounded layers of calcium hypochlorite, wherein the core of each particle generally has a diameter which ranges from about 200 to about 2,000 microns and the novel coated granules have a diameter ranging from about 400 to about 5,000 microns. The novel rounded granules of this invention are formed from a pumpable and sprayable aqueous slurry of calcium hypochlorite in a process which comprises:

(a) maintaining a moving bed of solid calcium hypochlorite particles containing from about 5 to about 30 percent by weight of water in the lower part of a distributing zone having an upper part and a lower part, (b) lifting a portion of the moving bed of particles to the upper part of the distributing zone and releasing the lifted particles to fall downwardly through the upper portion of the distributing zone to said moving bed in the lower portion thereof, (c) spraying onto said falling particles a pumpable and sprayable aqueous slurry of calcium hypochlorite containing from about 45 to about 90 percent by weight of water, (d) maintaining a temperature in said distributing zone sufficiently high to simultaneously evaporate and remove water from the slurry on said falling particles, whereby the resulting particles after water removal are coated with a layer of solid calcium hypochlorite and the water content of the resulting coated particle is maintained in the range from about 5 to about 30 percent by weight, and (e) removing at least a portion of the resulting coated solid calcium hypochlorite particles from the distributing zone.

Lack of cohesiveness between crystals of calcium hypochlorite is counteracted in the structure and growth of the novel granular hypochlorite of this invention in that freshly deposited, pliable moist layers of new hypochlorite solids are packed and pounded onto the dried hardened underlaying seed substrate by innumerable impacts as the grains cascade in the drum or are otherwise forced into violent collision with one another. Where crystalline particles are too large to submit to hardening by collision impact, these may retain individual identity as nuclei to seed the bed or they may be collected in a dry dust collector, pulverized and returned in more finely divided form, more susceptible to cohesion and hardening by collision impact.

If desired, the coated particles removed from the distributing zone can be further dried to reduce the water content to a lower level. Alternatively, the coated particles removed from the distributing zone can be conveyed to a second distributing zone where they are sprayed with another solution of calcium hypochlorite of a lower available chlorine concentration than the slurry utilized in the first distributing zone. In another embodiment of the invention, the coated particles removed from the distributing zone can be sprayed with an aqueous solution of an inorganic salt or certain molten hydrated inorgaic salts to form a plurality of layers of salt other than calcium hypochlorite on the exterior of the novel calcium hypochlorite particles. Sizing of the portion of coated calcium hypochlorite particles separated from the first distributing zone can be accomplished prior or subsequent to drying or other treatment.

The novel rounded granular calcium hypochlorite particles prepared in accordance with the process of this invention have a high level of integrity and resist dusting and degradation when subjected to severe handling conditions. For example, irregularly shaped granules of commercial hypochlorite break easily along the thin fragile edges when subjected to pressure and abrasion. The fragmented edges form fine dust easily dispersed in ambient atmosphere and results in severe respiratory irritation, discomfort and health hazards. Fragile edges are absent on the novel rounded grain of this invention and hence dusting cannot occur. Even if this novel grain fractures under pressure, fragments remain sufficiently large to escape entrainment in ambient air during normal handling of the product. As a result, even through the novel calcium hypochlorite particles of this invention may be fractured under severe handling conditions during shipment, nevertheless, a minimum of finely divided particles are formed. Also, as a result, a more uniform distribution of the calcium hypochlorite in the water being treated can be obtained and respiratory irritation and discomfort from entrained hypochlorite dust in air is greatly minimized. In addition, when the proper level of moisture content is obtained or when the particles have a coating of an anhydrous or hydrated inorganic salt on the exterior layers to encapsulate the active hypochlorite in an inert shell, there is a high degree of resistance to ignition by light cigarettes or the reaction caused when contacted with organic materials.

FIG. 1 shows two embodiments of the invention which utilize a spray grainer as a distributing zone, with recycle of fines and crushed oversize. In one embodiment, the product fraction is conveyed to a coating drum and without recycle, is then dried to the desired water level in a separate dryer. In the second embodiment, the product fraction is conveyed directly to the separate dryer.

Figure 1:
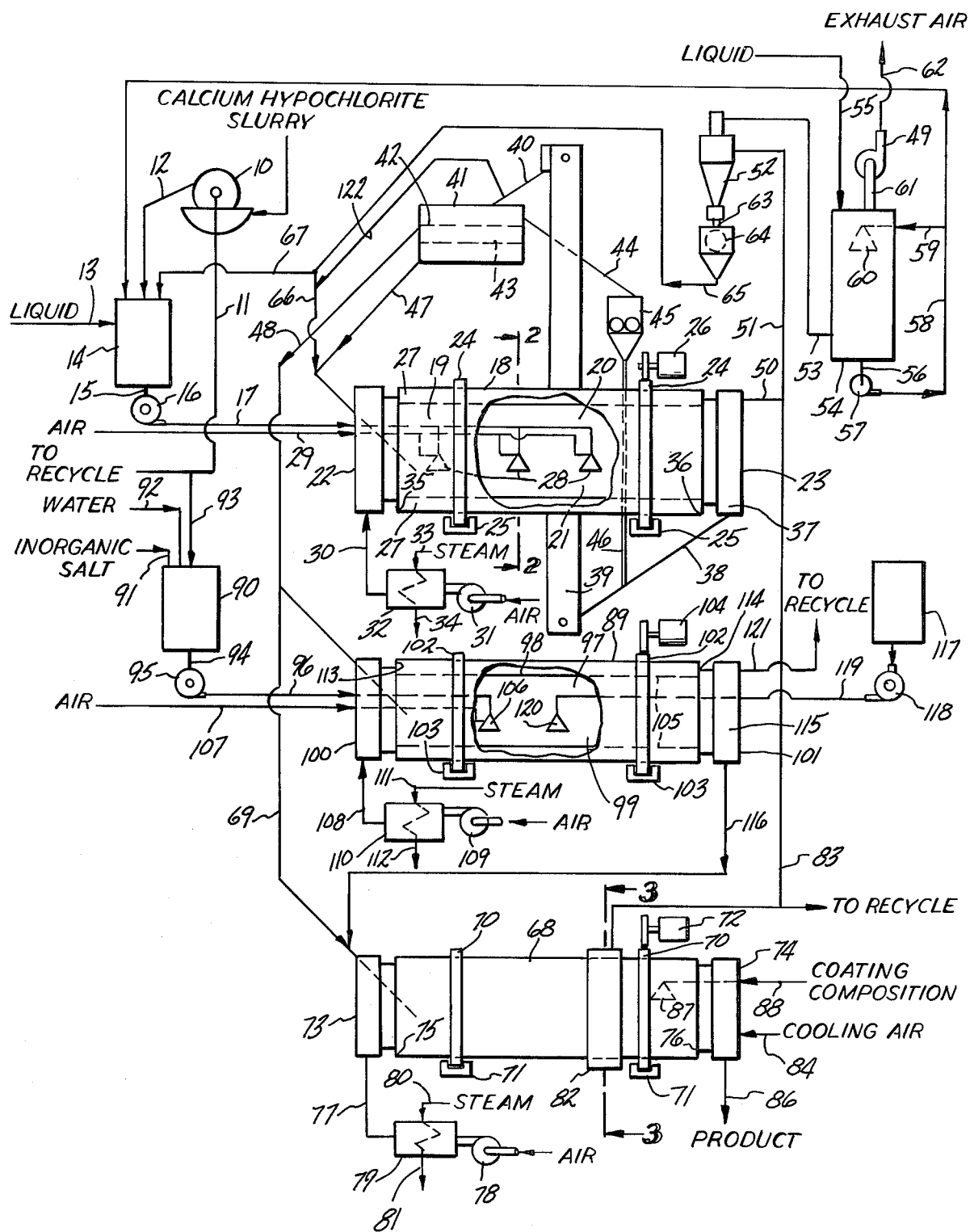

More in detail, as shown in FIG. 1, a calcium hypochlorite process slurry of the type formed in a commercial calcium hypochlorite process is conveyed to filter 10. Calcium hypochlorite slurry is separated into filtrate 11, which is recycled or otherwise processed, and filter cake 12, which is admixed with a liquid such as water fed through liquid line 13 into slurry mixer 14 to produce a pumpable and sprayable slurry of calcium hypochlorite. This slurry is conveyed from slurry mixer 14 through mixer discharge line 15 by means of slurry pump 16 through slurry feed line 17 to spray grainer 18.

Spray grainer 18 has a distributing zone 19 with an upper portion 20 and a lower portion 21, a feed end 22 and an opposite discharge end 23. Spray grainer 18 is provided with exterior tires 24 secured to the exterior thereof which are adapted to rotate in trunnions 25, exterior tires 24 being driven by a suitable motor driven rotation means 26 to effect rotation of spray grainer 18 within the desired speed range.

Figure 2:
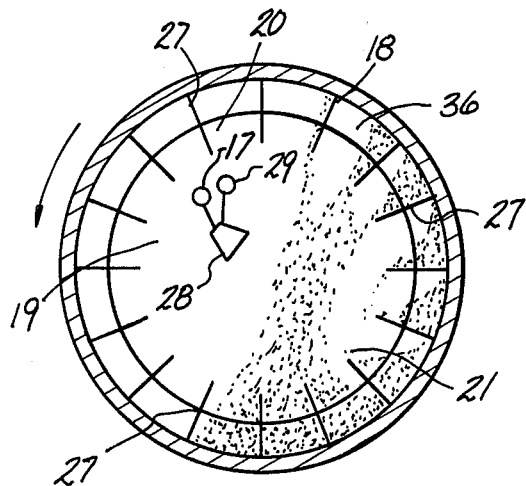
FIG. 2 is a cross-sectional view of the spray grainer of FIG. 1 through the lines 2—2.

As shown in FIG. 2, a bed of solid calcium hypochlorite particles is placed in lower portion 21 of distributing zone 19 to form, when spray grainer 18 is rotated, a moving bed of particulate solids which gradually progresses from feed end 22 to discharge end 23 of spray grainer 18. Transport of the feed from the feed end to the discharge end can be solely by interaction with a co-current flow of drying gases (as described below) or by a combination of gas induced transport aided or retarded by positive or negative slope of the drum axis. Bed transport can also be aided or detained by used of inclined vanes and dam rings attached to the interior of the drum wall.

As described further in FIG. 2, a series of lifters 27 are positioned around the interior circumference of spray grainer 18 to lift the particles of calcium hypochlorite from the moving bed in lower portion 21 to the upper portion 20 of distributing zone 19. As spray grainer 18 rotates, the particles gradually fall from lifters 27 as they approach the top of upper portion 20 and fall through distributing zone 19 to lower portion 21 into the moving bed of solid calcium hypochlorite particles. While the solid particles are falling from lifters 27 from upper portion 20 to lower portion 21 of distributing zone 19, slurry pump 16 is continuously conveying through slurry feed line 17 the pumpable and sprayable calcium hypochlorite slurry to a plurality of spray nozzles 28. Compressed air is conveyed through compressed air feed line 29 to nozzles 28 in order to disperse the slurry as fine droplets from the spray nozzles and to effect the spraying of these fine droplets of slurry onto the falling particles of calcium hypochlorite.

Heated air or other inert gas contacts the calcium hypochlorite particles wetted with the slurry to simultaneously evaporate and remove water and to deposit a thin solid layer of the calcium hypochlorite-containing component of the slurry on the surface of the wetted particles. The coated particles fall to the moving bed and continue to be lifted, dropped and coated until they are discharged from spray grainer 18. Any convenient heating technique may be employed. For example, heated air is preferably conveyed concurrently with the flow of the moving bed of solids through heated air line 30. Air is conveyed by blower 31 to heat exchanger 32 which is heated by steam conveyed through steam feed line 33 to heat exchanger 32. The heated air produced in heat exchanger 32 is conveyed through heated air line 30 by blower 31 into feed end 22 through spray grainer 18, and passed out discharge end 23. The heated air fed to spray grainer 18 is generally at a temperature in the range from about 85° C. to about 250° C. to effect simultaneous evaporation and removal of water from the falling particles. The steam condensate from heat exchanger 32 is discharged through steam discharge line 34.

At feed end 22 a feed retaining flange 35 is secured to the exterior wall of spray grainer 18 in order to retain the moving bed of particles within spray grainer 18. Similarly, at discharge end 23 a discharge retaining flange 36 is secured to the interior wall of spray grainer 18 in order to retain most of the moving bed of particles within spray grainer 18. Feed retaining flange 35 and discharge retaining flange 36 each have an opening in the center, preferably of circular shape. The diameter of the opening in discharge retaining flange 36 is preferably greater than the diameter of the opening of feed retaining flange 35 in order to insure that particles are discharged from spray grainer 18 at discharge end 23 rather than at feed end 22. For co-current air flow bed transport is primarily by interaction of the cascading bed with the air stream. Positive or negative axial slope can be used to aid or retard air transport. Also, internal dam rings (not shown) can be used to retard flow by increasing bed depth. Also, slanted vanes (not shown)

can be mounted to inner walls of spray grainer 18 to aid or retard bed transport.

As the number and size of calcium hypochlorite granules increases, the moving bed builds up behind discharge retaining flange 36 until a level is reached where the particles fall out through the opening in discharge retaining flange 36 into solids collection zone 37. Granules from solids collection zone 37 are conveyed by suitable conveying means to a suitable size classification apparatus. For example, a solids conveying means such as a chute 38, elevator 39 and inclined trough 40 convey all or part of the solids to screens 41 which are preferably heated to minimize blinding. However, other apparatus such as an air classifier may be used to separate the particles into an over-size fraction, an under-size fraction and a product fraction. By-pass line 122 returns solids in excess of the feed rate to spray grainer 18. Screens 41 contain an over-size screen 42 and an under-size screen 43 which separate over-size particles and under-size particles from the product fraction. Generally, any desired particle size can be obtained. In a typical separation, the over-size screen 42 has a mesh size in the range from about 4 to about 24 mesh and the under-size screen 43 has a mesh size in the range from about 16 to about 70 mesh. Under-size screen 43 always has a mesh opening smaller than over-size screen 42. A typical product fraction ranges from about −8 to +30 mesh, but the size range can be varied as desired. Over-sized particles retained by over-sized screen 42 are conveyed through over-size particle conduit 44 to roll crusher 45 where the over-size particles are crushed to pass through over-size screen 42 and then conveyed through crushed over-size particle conduit 46 to chute 38 where the crushed particles are recycled through elevator 39 to screens 41. Under-size particles which pass through under-size screen 43 are conveyed by means of under-sized particle conduit 47 to the feed end of spray grainer 18, where they serve as core particles or nuclei for the formation of additional granules of calcium hypochlorite. A product fraction of rounded granular calcium hypochlorite is collected in product conduit 48 and processed as described more fully below.

Exhaust fan 49 is used to withdraw moist air having finely divided particles of calcium hypochlorite suspended therein from solids collection zone 37 through a series of conduits and apparatus. The solid-laden moist air is withdrawn from solids collection zone 37 through conduit 50 to dust collector feed line 51 and into dry dust collector 52, preferably of the cyclone type. Air exhausted from the top of dry dust collector 52 is conveyed through air discharge line 53 to wet scrubber 54 for more effectual cleaning. Liquid such as water or a dilute calcium hypochlorite solution which may be produced as a by-product in the preparation of the calcium hypochlorite filter cake, is fed through liquid feed line 55 to the top of wet scrubber 54 where it contacts the moist air and removes the bulk of fine solid particles retained in the air. The resulting dust laden slurry is removed from the bottom of scrubber 54 through slurry discharge line 56 by means of scrubber pump 57. A portion of slurry discharged from scrubber pump 57 is conveyed to calcium hypochlorite slurry mixer 14 through slurry recycle line 58. The remainder of the slurry from slurry recycle line 58 is recycled to the top of scrubber 54 through slurry feed line 59 and then sprayed through scrubber nozzle 60 onto the rising dust laden air fed into the bottom of wet scrubber 54. Contact between the slurry and air removes substantially all of the suspended solids from the air. The resulting gases depleted of dust are conveyed through exhaust conduit 61 and exhaust fan 49, and discharged through air exhaust line 62 into the atmosphere, or are otherwise treated.

Dry dust collector 52 also separates dry particles of calcium hypochlorite from the moist air fed in through dust collector feed line 51. These dry particles are generally too coarse to form hard cohesive granules, particularly if recycled to spray grainer 18. Cohesion of the particles is improved by intensive pulverization. Thus, the dust particles are discharged from dry dust collector 52 through solids discharge line 63 into pulverizor 64. The solid particles are comminuted to a diameter of generally less than about 40 microns and then conveyed through pulverized particle line 65 to solids recycle line 66 which recycles the pulverized solids to spray grainer 18. If desired, a portion or all of the pulverized solids may be recycled to slurry mixer 14 through mixer recycle line 67.

The product fraction of rounded granular calcium hypochlorite particles which do not pass through under-size screen 43 are conveyed through product conduit 48 to the next processing step. Generally the moisture content of the product fraction of screens 41 ranges from about 5 to about 30 percent, and preferably from about 15 to about 27 percent by weight. When the moisture content of calcium hypochlorite ranges from about 0.5 percent to about 10 percent, the calcium hypochlorite granules possess sufficient chemical stability to be used as a commercial product, and may be conveyed to packaging. If the moisture content is above about 10 percent by weight and if it is desired to produce a material having less than about 10 percent moisture by weight, the product fraction is conveyed through product conduit 48 to a suitable dryer such as rotary dryer 68 through dryer feed conduit 69, as shown in FIG. 1.

Rotary dryer 68 is provided with at least two dryer tires 70 preferably constructed of metal, positioned at two mechanically-suitable locations near the extremity of rotary dryer 68. Dryer tires 70 rotate in dryer tire trunnions 71 and rotary dryer 68 is rotated by a suitable dryer motor drive means 72 which acts upon one of the dryer tires 70 to effect rotation of rotary dryer 68.

Rotary dryer 68 is provided with a dryer feed end 73 and a dryer discharge end 74. Dryer feed end 73 is provided with a retaining flange 75 and dryer discharge end 74 is provided with a discharge retaining flange 76 in order to maintain a moving bed of solids in rotary dryer 68. Retaining flange 75 and discharge retaining flange 76 are each provided with a circular opening in the center to permit entrance and exit of particles being dried. Heated air is fed into feed end 73 of rotary dryer 68 through heated air conduit 77. The heated air is provided by blowing atmospheric air through dryer blower 78 into heat exchanger 79 which is heated by exchange with steam fed to steam inlet 80. The heated air is conveyed to heated air conduit 77. The steam condensate is discharged from heat exchanger 79 through condensate discharge line 81.

Figure 3:
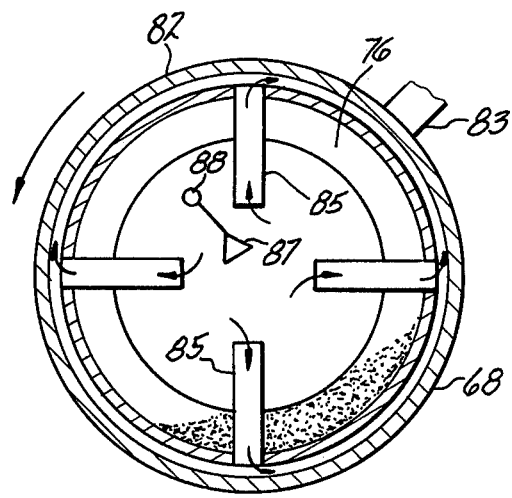
FIG. 3 is a cross-sectional view of the dryer of FIG. 1 through the lines 3—3 of FIG. 1.

FIG. 3 is a cross-sectional view of rotary dryer 68 through 3—3 of FIG. 1. As indicated in FIGS. 1 and 3, rotary dryer 68 is provided with an air exhaust bustle 82 which communicates with dry dust collector 52 by means of gas discharge conduit 83 from dryer 68 to dust collector feed line 51. Exhaust fan 49 withdraws the hot gases which have increased in moisture content within rotary dryer 68 as well as cool air which is drawn into discharge end 74 of dryer 68 through cool air feed line 84. The hot mixture laden gases from the feed end 73 and the cool moist gases from the discharge end 74 are withdrawn through tubes 85 located around the periphery of the internal wall of rotary dryer 68. Tubes 85 communicate with a chamber located in bustle 82. Gas discharge conduit 83 positioned in bustle 82 conveys the mixture of gas and any finely divided calcium hypochlorite that may be present in the chamber within bustle 82 to dry dust collector 52 where it is processed in the same manner as the moist air containing finely divided calcium hypochlorite which is conveyed by conduit 50 from solids collection zone 37 to dry dust collector 52. FIG. 3 also shows retention of the moving bed of solids in dryer 68 by means of discharge retaining flange 76. Granular calcium hypochlorite particles which have been dried in dryer 68 pass over discharge retaining flange 76 into product collection line 86 where they are conveyed to storage or other processing.

Bed transport towards the discharge end 74 is induced by interaction of cascading solids with the co-current flow of drying gases. If desired, rotary dryer 68 may be set at a positive or negative slope from dryer feed end 73 towards dryer discharge end 74 to aid or retard bed transport due to co-current air flow. The particles of calcium hypochlorite are thereby moved at a controlled rate from the feed end 73 towards the discharge end 74 as rotary dryer 68 is rotated. In addition, inclined vanes, (not shown) may be mounted on the interior walls of the rotary dryer 68 in discharge end 74 to aid in the forward transport of the bed through the counter-current air flow zones. Bed depth in discharge end 74 of rotary dryer 68 can be limited by selection of a suitable diameter for retaining flange 76 in discharge end 74.

Rotary dryer 68 may be provided with internal flights similar to lifters 27 of spray grainer 18 in order to move a substantial portion of the particles to be dried to the upper portion of rotary dryer 68 and thereby increase the degree of contact between the particles and the drying air as well as the cooling air. Little or no dusting occurs.

Conventional granular calcium hypochlorite particles are in the form of irregular sharp-edged flakes which must be prepared and dried under substantially quiescent conditions with a minimum of agitation because of the sensitivity of the fragile edges to attrition and a high level of dusting. Unlike conventional granular calcium hypochlorite, the rounded granular calcium hypochlorite particles of this invention can be subjected to severe conditions of agitation and crushing during granulation and drying without the formation of excessive quantities of dust because sharp, fragile edges are totally absent.

Without being bound by theory, it is believed that the improved structure of the calcium hypochlorite particles of this invention are a result of the formation of pliable moist layers of new calcium hypochlorite solids which are packed and pounded onto the dried hardened underlaying core or seed substrate by innumerable impacts as the particles cascade in the distribution zone or are otherwise forced into violent collision with one another during processing.

As the solids progress through the distribution zone, layer upon layer of calcium hypochlorite is formed on the seed particles in an onion-like manner, each layer imparting strength to the particles.

The novel granules of this invention have a high degree of integrity and when subjected to a severe pressing force will fracture into integral particles of the granule, rather than decompose into dust, which occurs with conventional granular calcium hypochlorite particles under the same conditions.

In order to improve the storage stability of the rounded granular calcium hypochlorite particles produced by the process of this invention, as well as particles produced by conventional calcium hypochlorite processes, it is desirable to coat these particles with a protective coating of an inorganic salt. In one embodiment, the protective coating may be applied after drying in rotary dryer 68. In another embodiment, the protective coating is applied to calcium hypochlorite particles before final drying if the moisture content of the coating solution slurry exceeds the moisture to be allowed in the final product. Excess moisture from the coating slurry is then volatilized with the water of hydration of the calcium hypochlorite in the final drying step. The particle size of the uncoated calcium hypochlorite particles to be coated generally corresponds to that of the product produced in spray grainer 18 which is discharged through product conduit 48 from screens 41 in FIG. 1.

In the first of these embodiments, rotary dryer 68 may be provided with a spray nozzle 87 which is connected to spray feed line 88 which provides a solution, slurry, or melt of an additional coating composition such as a surface conditioning agent or a molten hydrated salt which may be applied in small proportions to the dried particles to improve flowability, prevent caking or in order to form additional exterior layers of a flame resistant material which will protect the encapsulated calcium hypochlorite from ignition when contacted with lighted cigarettes, organic liquids and the like. When the calcium hypochlorite granules are coated in this manner, gas discharge conduit 83 does not convey the hot gases containing suspended solids to dry dust collector 52, but instead conveys the gases from air exhaust bustle 82 to a separate dry or wet dust collection system (not shown) where solid particles are separated and recycled to the bed or coating composition make-up vessel (not shown) and fed through spray feed line 88 to dryer 68. This technique prevents recycle of the coating composition to the beginning of the process and prevents contamination of the calcium hypochlorite cores with the particles of coating composition.

In the second of these embodiments, as shown in FIG. 1, a coating composition in solution or slurry form is prepared in spray feed tank 90 by addition of the inorganic salt through inorganic salt feed line 91 and water through water feed line 92. If desired, calcium hypochlorite may be employed as the coating composition by utilizing a portion of filtrate 11 from filter 10 which is fed to spray feed tank 90 by filtrate feed line 93. The components of the coating composition are admixed in spray feed tank 90 to form a pumpable and sprayable solution or slurry of the inorganic salt. This slurry is conveyed from spray feed tank 90 through feed tank discharge line 94 by means of coating pump 95 through coating feed line 96 to second spray grainer 89.

Second spray grainer 89 has a coating distributing zone 97 with an upper portion 98 and a lower portion 99, a feed end 100 and an opposite discharge end 101. Spray grainer 89 is provided with exterior tires 102 secured to the exterior thereof which are adapted to rotate in trunnions 103, exterior tires 102 being driven by a suitable motor driven rotation means 104 to effect rotation of second spray grainer 89 within the desired speed range. A cross-sectional area of second spray grainer 89 corresponds to that of spray grainer 18 of FIG. 2. In the operation of second spray grainer 89, a bed of solid calcium hypochlorite particles to be coated is placed in lower portion 99 of coating distributing zone 97 to form, when spray grainer 89 is rotated, a moving bed of particulate solids which gradually progresses from feed end 100 to discharge end 101 of second spray grainer 89. Transport of the feed from the feed end to the discharge end can be solely by interaction with a co-current flow of drying gases (as described below) or by a combination of gas induced transport aided or retarded by positive or negative slope of the axis of second spray grainer 89. Bed transport can also be aided or detained by use of inclined vanes and dam rings attached to the interior of the drum wall.

As described further in FIG. 1, a series of lifters 105 are positioned around the interior circumference of second spray grainer 89 to lift the particles of calcium hypochlorite from the moving bed in lower portion 99 to upper portion 98 of coating distributing zone 97. As second spray grainer 89 rotates, the particles gradually fall from lifters 105 as they approach the top of upper portion 98 and fall through coating distributing zone 97 to lower portion 99 into the moving bed of solid calcium hypochlorite particles. While the solid calcium hypochlorite particles are falling from lifters 105 in upper portion 89 to lower portion 99, coating pump 95 is continuously conveying through coating feed line 96 the pumpable and sprayable coating composition to at least one coating spray nozzle 106. Compressed air is conveyed through compressed air feed line 107 to nozzle 106 in order to disperse the coating composition as fine droplets from the coating spray nozzle 106 and to effect the spraying of these fine droplets of coating composition onto the falling particles of calcium hypochlorite.

Heated air or other inert gas contacts the calcium hypochlorite particles wetted with the solution or slurry of coating composition to simultaneously evaporate and remove water, and to deposit a thin layer of the solid coating composition on the surface of the calcium hypochlorite particles. The coated particles fall to the moving bed, and continue to be lifted, dropped and coated until they are discharged from second spray grainer 89. As the solids progress through the distribution zone, layer upon layer of the coating composition forms on the calcium hypochlorite particles and encapsulate the calcium hypochlorite particles with the coating composition to improve the chemical and thermal stability of these particles. Any convenient heating technique may be employed. For example, heated air is preferably conveyed concurrently with the flow of the moving bed of solids through heated air line 108. Air is conveyed by blower 109 to heat exchanger 110 which is heated by steam conveyed through steam feed line 111 to heat exchanger 110. The heated air produced in heat exchanger 110 is conveyed through heated air line 108 by blower 109 into feed end 100 through second spray grainer 89, and passed out discharge end 101. The heated air fed to second spray grainer 89 is generally at a temperature in the range from about 85° C. to about 250° C. to effect simultaneous evaporation and removal of water from the falling particles. The steam condensation from heat exchanger 110 is discharged through steam discharge line 112.

At feed end 100 a feed retaining flange 113 is secured to the exterior wall of second spray grainer 89 in order to retain the moving bed of particles. Similarly, at discharge end 101, a discharge retaining flange 114 is secured to the interior wall of second spray grainer 89 in order to retain most of the moving bed of particles. Feed retaining flange 113 and discharge retaining flange 114 each have an opening in the center, preferably of circular shape. The diameter of the opening in discharge retaining flange 114 is preferably greater than the diameter of the opening of feed retaining flange 113 in order to insure that particles are discharged from second spray grainer 89 at discharge end 101 rather than at feed end 100. As in spray grainer 18, co-current air flow bed transport is primarily by interaction of the cascading bed with the heated air stream provided by heated air line 108. Positive or negative axial slope can be used to aid or retard air transport. Also, internal dam rings (not shown) can be used to retard flow by increasing bed depth. Also, slanted vanes (not shown) can be mounted to inner walls of second spray grainer 89 to aid or retard bed transport.

As the number and size of calcium hypochlorite granules coated with the coating composition increases, the moving bed builds discharge retaining flange 114 until a level is reached where the particles fall out through the opening in discharge retaining flange 114 into coated solids collection zone 115. Coated calcium hypochlorite granules from solids collection zone 115 are conveyed to dryer feed conduit 69 of rotary dryer 68 by means of coated solids conveying means 116, or are otherwise processed. Size classification of the product of second spray grainer 89 can be effected, if desired, with recycle of the undersize and crushed oversize fractions, but generally this size separation is not necessary.

If desired, another coating composition in liquid or slurry form may be applied over the coating composition provided through coating feed line 96. In this embodiment, the second coating composition is placed in second coating tank 117 and pumped by means of second coating pump 118 through second coating feed line 119 to at least one second coating spray nozzle 120. Compressed air (not shown) may be provided to disperse the second coating composition into fine droplets for better contact with the calcium hypochlorite particles.

A separate dust recovery system (not shown), employing an exhaust fan such as exhaust fan 49 is used to withdraw moist air having finely divided particles of calcium hypochlorite suspended therein from solids collection zone 115 through conduit 121 to dust collector feed line 51 and into a dry dust collector like dry dust collector 52, and a wet scrubber like wet scrubber 54 in the same manner as moist air is withdrawn from spray grainer 18. Recovered solids are recycled as feed to second spray grainer 89.

The coated product of second spray grainer 89 are rounded, granular calcium hypochlorite particles coated with the coating composition. Generally, the moisture content of the coated particles ranges from about 5 to about 30 percent, and preferably from about 15 to about 27 percent by weight. When the moisture content of the coated calcium hypochlorite ranges from about 0.5 percent to about 10 percent, it possesses sufficient chemical stability to be used as a commercial product, and may be conveyed to packaging. If the moisture content is above about 10 percent by weight and if it is desired to produce a material having less than about 10 percent moisture by weight, the coated particles are conveyed through product conduit 116 to rotary dryer 68 through dryer feed conduit 69, as shown in FIG. 1.

Figure 4:
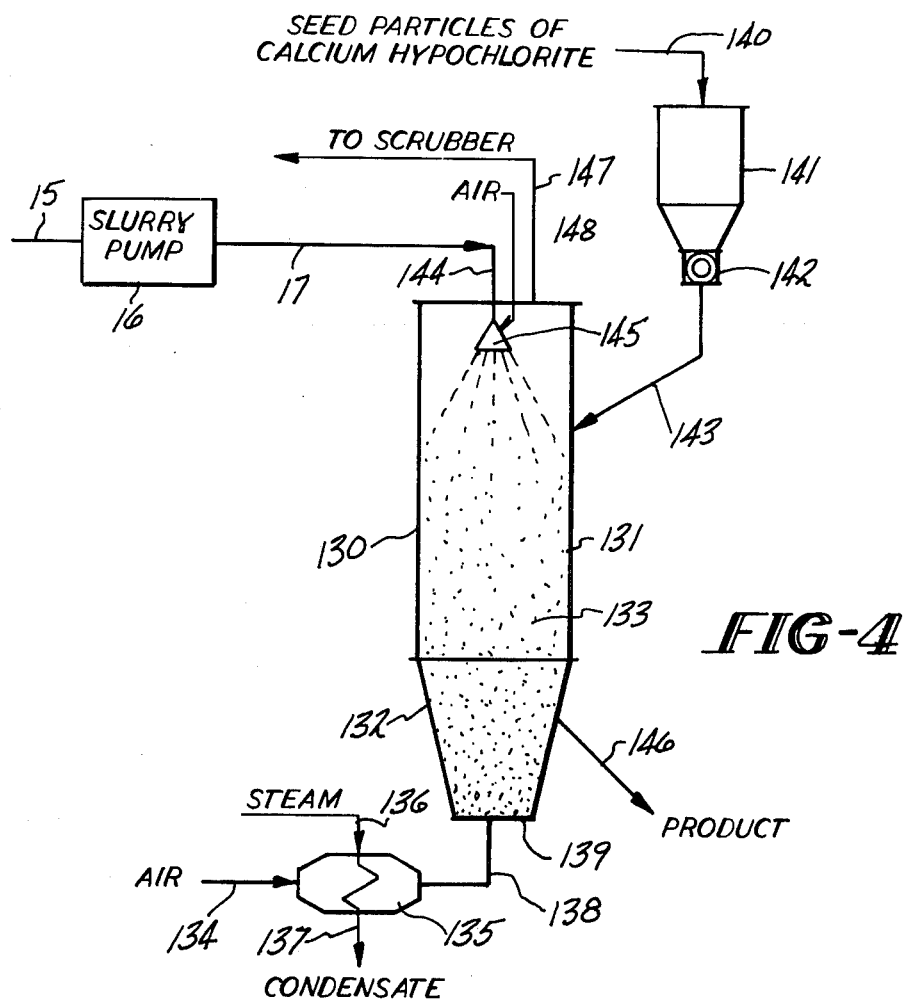
FIG. 4 shows a schematic diagram of an embodiment of the invention in which a fluidized bed is used as the distribution zone.

FIG. 4 shows an embodiment of this invention in which a fluidized bed technique is used as the distribution zone. Fluidized bed apparatus 130 is comprised of an upper tower 131 in the upper portion and a lower frusto-conical section 132 in the lower portion. A moving bed of solid particles of calcium hypochlorite 133 is suspended within fluidized bed apparatus 130 by means of a suitable gas such as air or nitrogen, which is fed by means of gas feed line 134 into heat exchanger 135 and heated with steam fed into steam inlet 136 and discharged through condensate line 137. Heated air or nitrogen from heat exchanger 135 is conveyed through heated gas line 138 into the bottom of frusto-conical section 132 into diffuser grid 139. Heated air or nitrogen is fed through the diffuser grid 139 under sufficient pressure and velocity to maintain the moving bed of solid calcium hypochlorite particles 133 suspended within fluidized bed apparatus 130. Solids in the moving bed have substantially the same composition at start-up as the moving bed employed in spray grainer 18 of FIGS. 1, 2, and 3. These feed particles of calcium hypochlorite generally have a particle size in the range from about 200 to about 2,000 microns, and preferably from about 400 to about 1,000 microns in diameter. They may be obtained by crushing commercial granular calcium hypochlorite to the desired particle size, by utilizing a more finely divided product produced in conventional calcium hypochlorite processes, or by recycling fines from another or the same fluidized bed operation. These finely divided seed particles are conveyed through solids conveying means 140 to hopper 141 which is provided with rotary feed means 142 for controlling the rate of feed of the solid particles to the upper portion of upper tower 131 by means of controlled solid feed line 143.

Calcium hypochlorite slurry from calcium hypochlorite slurry mixer 14 (not shown) of FIG. 1 is conveyed through mixer discharge line 15 to slurry pump 16 which conveys the calcium hypochlorite through slurry feed line 17 to fluidized bed slurry feed line 144 and into at least one spray head 145 to the upper portion of upper tower 131. The calcium hypochlorite slurry is sprayed through spray head 145 on to the suspended particles in the moving bed of calcium hypochlorite 133 maintained in fluidized bed apparatus 130. As the calcium hypochlorite slurry coats the surfaces of seed particles of calcium hypochlorite, the heated air or nitrogen gas in the bed simultaneously removes and evaporates the water component of the slurry, leaving a thin layer of solid calcium hypochlorite on the seed particles of calcium hypochlorite initially fed into the suspended bed. Freshly deposited pliable solids are compacted and hardened with the hard dry seed particles by collision impacting of the grains against one another. This coating technique is continued as the particles contact additional spray of calcium hypochlorite slurry. Although the heated air or nitrogen gas is fed through heated gas line 138 at sufficient pressure and velocity to maintain substantially all of the solid particles in suspension, there is a tendency for the lighter particles to gravitate to the upper portion of the moving bed in upper tower 131 and for the heavier particles to gravitate to the frusto-conical section 132 in the lower part of fluidized bed apparatus 130. An appropriate discharge line 146 is positioned in lower frusto-conical section 132 to remove at least a portion of the suspended particles in the moving bed during the continuous operation of fluidized bed apparatus 130. This portion of the calcium hypochlorite particles removed through discharge line 146 generally has a particle size in the range from about 400 to about 5,000, and preferably from about 500 to about 2,500 microns. In addition, the moisture content of these calcium hypochlorite particles is in the range from about 15 to about 30 percent, and preferably from about 20 to about 25 percent by weight. If desired, the calcium hypochlorite particles separated in discharge line 146 are conveyed to a size classification apparatus such as screens 41 (not shown) wherein the undersized and oversize fractions are obtained along with the product size fraction. Undersize fraction from the screens is recycled to hopper 141 as seed particles of calcium hypochlorite for the fluidized bed apparatus 130. Oversize fraction is crushed and then recycled to the screens.

The product fraction, which generally has a particle size in the range from about 400 to about 3,000, and preferably from about 600 to about 2,000 microns, may be stored for use as a sanitizing agent, or may be further dried in a dryer of the type shown in FIGS. 1 and 3, as rotary dryer 68.

Exhaust gases are conveyed from the top of upper tower 131 through gas discharge line 147 to a suitable dust collection and scrubbing system such as cyclone 52 and scrubber 54 in FIG. 1 which scrubs the exhaust gases in a suitable liquid to remove the finely divided particles of calcium hypochlorite entrained therein. The resulting slurry is recycled to slurry mixer 14 of FIG. 1.

If desired, compressed air may be fed into spray head 145 through compressed air feed line 148 in order to produce a finely divided spray of calcium hypochlorite slurry as discharge from spray head 145.

More in detail, with respect to the process of this invention, any pumpable and sprayable calcium hypochlorite slurry containing from about 45 to about 90 percent by weight of water, and preferably from about 50 to about 60 percent by weight of water may be employed in the process of this invention. Generally, this slurry is prepared by admixing water with the filter cake of calcium hypochlorite produced in conventional commercial calcium hypochlorite processes of the type described in U.S. Pat. Nos. 2,195,754-7, described above.

Although water is normally used to make up the slurry, any suitable recycle liquid such as a portion of the filtrate produced in commercial calcium hypochlorite processes, scrubber liquor, or other aqueous mediums that are inert to calcium hypochlorite may be employed. If the water concentration of the slurry is below about 45 percent by weight, the resulting slurry is extremely difficult to pump and spray. On the other hand, when the water concentration is above about 90 percent by weight, an extremely large amount of water must be evaporated, and as a result the feed rate must be reduced, and the production rate is reduced. In addition, there is excessive decomposition of available chlorine when the moist calcium hypochlorite particles are exposed to the heated atmosphere for the extended periods which are necessary to effect evaporation of such large quantities of water.

Other processes for preparing suitable calcium hypochlorite filter cakes are described in *Encyclopedia of Chemical Technology*, Kirk and Othmer, Second Edition, Volume 5, pp 21-24.

More recently, another technique for preparing calcium hypochlorite filter cake and subsequent drying by conventional techniques is described in U.S. patent application Ser. No. 340,121, filed by Walter J. Sakowski, on Mar. 12, 1973 now U.S. Pat. No. 3,895,099, which issued July 19, 1975. The filter cake of this process may also be used to prepare the calcium hypochlorite slurry used in the process of this invention. If desired, dry finely divided, pulverized particles of calcium hypochlorite, such as dust recovered in the dry dust collector may be admixed with an appropriate liquid, or dilute solutions or slurries of calcium hypochlorite may be evaporated to form a slurry having a calcium hypochlorite concentration within the above defined ranges and used as a starting slurry in the process of this invention.

The proportion of impurities in the calcium hypochlorite slurry will vary with the type of process employed to prepare the calcium hypochlorite filter cake and also with the nature of the lime initially used to prepare the calcium hypochlorite. A typical analysis of a calcium hypochlorite filter cake prepared by a commercial process and a typical preferred analysis range for the calcium hypochlorite slurry useful as a starting material in the process of this invention are as follows:

| Component | Typical Filter Cake Analysis Percent By Weight | Typical Cake Analysis Range, Percent By Weight |
|---|---|---|
| Calcium hypochlorite | 45.43 | 42–48 |
| Calcium chloride | 0.44 | 0.0–1.5 |
| Calcium chlorate | 0.02 | 0.0–1.5 |
| Calcium hydroxide | 0.24 | 0.2–2.0 |
| Calcium carbonate | 0.44 | 0.1–2.0 |
| Sodium chloride | 7.75 | 6.0–8.0 |
| Water (Difference) | 45.68 | 40–50 |

A suitable rate of feed of the slurry of calcium hypochlorite particles will depend upon a number of factors such as size of the distribution zone, the relative size of the moving bed, the solids concentration of the slurry, the temperature and velocity of the drying gases, the rate of discharge, and the number of spray nozzles positioned in the spray grainer 18 or fluidized bed apparatus 130 as the case may be. Generally, the slurry feed rate for a slurry containing about 55 percent by weight of water ranges from about 100 to about 500 pounds per hour in a spray grainer 18 having a diameter of about 3 feet. In a fluidized bed apparatus of about 3 feet diameter, the feed rate of slurry ranges from about 20 to about 100 pounds per hour.

Faster or slower feed rates may be employed, if desired.

The hold-up time in the distribution zone should be maintained at a minimum since excessive exposure of calcium hypochlorite particles to elevated temperature causes a substantial reduction in the available chlorine concentration. Thus, the total hold-up time in the distribution zone generally ranges from about 30 to about 300 minutes and preferably from about 30 to about 90 minutes. Under conditions of restricted heat input, hold-up time may range up to about 150 to 300 minutes. Dryer hold-up time generally ranges from about 5 to about 50 minutes and preferably from about 10 to about 25 minutes.

The rate of feed or input will have to correspond to the rate of discharge of products in order to prevent buildup or depletion of the moving bed to an undesirable degree. The number and size of spray nozzles 28, 106, or 145 will depend upon the length of spray grainer 18 or 89, or the cross sectional area of fluidized bed apparatus 130, as the case may be. The spray is utilized in order to obtain maximum dispersion and contact of finely divided droplets of the slurry of calcium hypochlorite or coating composition with the moving particles of calcium hypochlorite in the apparatus being employed. In view of the solids content of the aqueous slurry of calcium hypochlorite, it is necessary to use spray nozzles that are provided with openings of sufficient diameter to prevent clogging of the spray nozzles.

The rate of slurry feed through the spray must be in balance with the local heat transfer rate in the drum. Since this declines exponentially as the temperature differential declines the spray rate through two or more sequential nozzles should also be in the same exponential proportion.

In order to obtain the desired dispersion of the calcium hypochlorite slurry in the distribution zone, air, nitrogen or other suitable gas which is inert to calcium hypochlorite is compressed and used to disperse the aqueous slurry through the spray nozzle heads. In spray grainer 18 of FIG. 1, it is desired to position spray nozzles 28 in upper portion 20 of the distribution zone 19, as indicated in FIG. 2, on the side opposite from the cascading stream of falling particles. The nozzles should be positioned as close as possible to the falling particles to insure that the slurry contacts the falling particles before the heated gases are capable of evaporating water from the droplets. It is permissable for each spray to be in contact with the cascading stream of falling particles of calcium hypochlorite provided the force of the stream is not strong enough to block the discharge of the spray of calcium hypochlorite slurry from spray nozzles 28. Spray nozzles 106 and 120 are positioned in second spray grainer 89 in the same manner as shown in FIG. 2.

Axial rotation of spray grainers 18 and 89 is preferably within the range from about 10 rpm to about 45 rpm when the diameter of the drum of spray grainer 18 or 89 ranges from about 1 foot to about 12 feet. These rotation speeds are determined in accordance with the formula:

$$rpm = 20 \sqrt{3/D(ft.)},$$

where $D$ = drum diameter

Lower speeds are also practical in accordance with the formula:

$$rpm = 5 \sqrt{3/D(ft.)}$$

Other speeds between and beyond these limits are also permissable.

Rotation of spray grainers 18 and 89 and rotary dryer 68 is effected by any convenient motor driven means such as electric motors with chain or gear drives.

Evaporation of the liquid component of the slurry is effected in spray grainers 18 or 89, or fluidized bed apparatus 130 by any suitable heating means such as by means of a heated gas such as air or nitrogen or other gas which is inert to calcium hypochlorite. The gas may be heated indirectly in a heat exchanger, with steam, hot combustion gases or any other suitable manner. Gases which contain relatively large proportions of carbon dioxide and water vapor are not suitable for drying the liquid components from the slurry in spray grainers 18 or 89 or fluidized bed apparatus 130 since the water component and the carbon dioxide component react with the calcium hypochlorite particles to form undesirable byproducts. However, combustion gases or other heating means may be used to externally heat spray grainers 18 or 89 or fluidized bed apparatus 130 in order to maintain a temperature within spray grainers 18 or 89 or fluidized bed apparatus 130 which is sufficiently high to effect the removal and evaporation of liquid from the slurry of calcium hypochlorite without excessive decomposition of the resulting solid calcium hypochlorite granules. Other suitable heating means include external heating of the distribution zone with combustion gases, liquid or solid fuels impinging on the drum walls, electrical heat, direct flame or other direct heating source being applied to the exterior of fluidized bed apparatus 130 or spray grainers 18 or 89.

As indicated in FIGS. 1 and 4, evaporation and removal of the water from the surface of the coated calcium hypochlorite particles is effected by passing a stream of heated gas, such as air, nitrogen or other inert gas con-currently through spray grainer 18 or 89, or fluidized bed apparatus 130, as the case may be. If external means are utilized to heat the distribution zone, it is still necessary to maintain a flow of gas through the distribution zone in order to remove the humidified atmosphere that is formed by evaporation and removal of the water from the slurry on the coated particles. The temperature of the distribution zone is maintained in the range from about 40° to about 70° C., and preferably from about 45° to about 60° C., by means of the heated gas which is passed through the distribution zone. It is preferred to pass the air con-current to the flow of the moving bed of solids in spray grainers 18 or 89, but counter-current flow may also be employed, if desired. The temperature and volume of the gas fed to the distribution zone are correlated with the rate of feed of the slurry, recycle solids, water content and residence time in order to maintain a suitable bed temperature and also effect the desired degree of evaporation of moisture from the calcium hypochlorite particles. In order to maintain the temperature of the distribution zone within the above defined ranges, it is generally necessary to feed heated gas into the feed end of spray grainers 18 or 89, or the frusto conical sectional of fluidized bed apparatus 130 at a temperature in the range from about 85° C. to about 250° C., and preferably from about 100° to about 200° C. The higher temperatures are suitable with short residence times and higher bed temperatures and the lower temperatures are employed with the longer residence time at lower bed temperatures in order to minimize excessive decomposition of the available chlorine component of the calcium hypochlorite particles due to overheating.

The calcium hypochlorite particles removed from solids collection zone 37 of FIG. 1, and discharge line 146 of FIG. 4 generally have a moisture content in the range from about 5 to about 30 percent and preferably from about 15 to about 27 percent by weight of water. The available chlorine content (on a dry basis) generally ranges from about 50 to about 85 percent and preferably from about 60 to about 83 percent by weight. Although such a product may be used directly in the treatment of water and the like, it is subject to loss of available chlorine when the moisture content is in excess of about 10 percent by weight and the product is stored at elevated temperatures for extended periods. Therefore, it is desirable to further dry products having a moisture content in excess of about 10 percent by weight in a dryer such as rotary dryer 68.

Calcium hypochlorite particles produced in spray grainers 18 or 89, or fluidized bed apparatus 130 which have the desired moisture content and available chlorine content must be cooled before storage. Generally, cooling can be effected in a rotary drum wherein the particles are lifted in a manner similar to the moving bed of spray grainers 18 or 89, or fluidized bed 130 and subjected to an atmosphere of cool ambient air maintained, for example, at a temperature from about 20° to about 40° C. Generally, storage of the thus produced calcium hypochlorite particles may be effected when the temperature is below about 40° C.

As indicated in FIG. 1, it is preferred to screen or otherwise classify the product of spray grainer 18 or fluidized bed 130 to obtain a product fraction of the desired particle size. However, if particle size of the product is not important, sizing of the product of spray grainer 18 can be eliminated. In that case, seed particles of finely divided calcium hypochlorite from another source is fed to spray grainer 18 for coating with calcium hypochlorite. Generally, the product fraction ranges from about 4 to about 40 mesh and preferably from about 10 to about 30 mesh.

In a preferred embodiment of the invention, the product of spray grainer 18 or fluidized bed 130 is screened to obtain a product fraction within the above defined particle size range. The product fraction as well as the product of second spray grainer 89, is then further dried to a water content in the range from about 0.5 percent to about 10 percent and preferably from about 1.0 percent to about 8.0 percent by weight of water. Drying to remove water of hydration is generally effected at a temperature higher than necessary to effect evaporation of free water from the slurry on the particles of calcium hypochlorite in spray grainers 18 and 89, or fluidized bed 130. Generally, the temperature in the heating end of rotary dryer 68, of the type shown in FIGS. 1 and 3, is maintained in the range from about 65° C. to about 100° C. and preferably from about 70° C. to about 80° C. In order to maintain this drying bed temperature, heated air or other suitable gas is fed to the dryer concurrently with the feed at a temperature in the range from about 85° C. to about 250° C., and preferably from about 100° C. to about 200° C. Simultaneously, ambient cooling air having a temperature from about 0° to about 40° C., for example, is fed counter-currently at the discharge end of dryer 68 in order to reduce the temperature of the dried particles to within a range where decomposition of the available chlorine component of the calcium hypochlorite particles does not occur to a substantial degree. This technique reduces decomposition and also avoids problems of aggregation and sticking of the finished calcium hypochlorite product. The hot dry product can also be conveyed to a separate air-cooled cooling drum to conveyor coolers with water cooled jackets, to fluidized bed air coolers or the like.

Drying of the calcium hypochlorite in dryer 68 is generally a dehydration step as well as a drying step. Solid calcium hypochlorite particles in the aqueous slurry fed to spray grainer 18 are primarily in the form of calcium hypochlorite dihydrate which contains about 16.6 percent by weight of hydrated water. Thus, when the product fraction discharged from product conduit 48 contains more than about 16.6 percent water by weight, the water in excess of this amount is free water. When the product from product conduit 48 or the dry product from rotary dryer 68 contains less than about 16.6 percent water, the bulk of the water is present as hydrated calcium hypochlorite rather than as free water.

The dried calcium hypochlorite particles from rotary dryer 68 contains from about 50 to about 85 percent by weight of calcium hypochlorite (dry basis) and from about 0.5 to about 10 percent by weight of water. The calcium hypochlorite particles maintain their integrity during the drying stage since the layered structure formed in spray grainers 18 or 89, or fluidized bed apparatus 130 imparts a unique degree of strength to these particles which assists in resisting degradation when subjected to rather severe handling conditions in the dryer. The rounded grains are smooth and devoid of sharp fragile edges and corners which easily forms dust under abrasive conditions of movement. As a result, an additional screening step is not necessary to improve the utility of the calcium hypochlorite product of this invention.

The particle size of the dried calcium hypochlorite granules which have not been coated with an additional inorganic salt is substantially the same as the particle size of the product fraction of spray grainer 18 or fluidized bed apparatus 130 that is fed to rotary dryer 68.

The calcium hypochlorite particles produced by this novel process are ready for packaging, storage, shipping and use in the purification of water and the like.

In addition to producing calcium hypochlorite particles of improved strength, the novel process of this invention also results in improved yield of calcium hypochlorite based upon initial lime and chlorine reactants since there is a substantial reduction in the amount of available chlorine lost during the processing of the filter cake to produce a dry granular product.

Improvement of the chemical and thermal stability of the novel calcium hypochlorite particles of this invention or conventional calcium hypochlorite particles is achieved by encapsulating the particles in a protective coating of an inorganic salt. Typical examples of suitable inorganic salts include calcium hypochlorite, as well as chlorides, chlorates, nitrates, carbonates, silicates, phosphates, sulfates, pyrophosphates, tripolyphosphates, hexametaphosphates and tetraphosphates of an alkali metal such as sodium, potassim and lithium and mixtures thereof. In addition, certain hydrated salts which melt at relatively low temperatures, i.e. below about 150° C., but which are solid at ambient temperatures may also be used to form a protective coating on the inorganic salts. Typical examples of suitable low melting hydrated salts are aluminum sulfate hydrate, (from about 12 to 18 moles of water), magnesium sulfate hydrate, (from about 4 to 7 moles of water), eutectic mixtures of tetra- and meta-borates of alkali metals and the like.

The protective coating may be applied in either second spray grainer 89 or rotary dryer 68, depending upon the properties of the coating composition. For example, inorganic compounds which are applied as an aqueous solution or slurry and require evaporation of the aqueous component in order to obtain a thin protective coating on the calcium hypochlorite particles, are fed to second spray grainer 89 through coating feed line 96.

Pumpable and sprayable aqueous solutions or slurries of calcium hypochlorite, as well as chlorides, chlorates, nitrates, carbonates, silicates, phosphates, sulfates, pyrophosphates, tripolyphosphates, hexametaphosphates, and tetrametaphosphates of alkali metals such as sodium and potassium are applied in spray grainer 89. The concentration of the coating composition in the aqueous solution or slurry will vary with the inorganic compound, but should be generally in the range from about 40 to about 90 percent water. Too much water requires excessive exposure of the calcium hypochlorite to hot gases, which causes loss of available chlorine. Too little water in the coating composition may cause spraying problems.

In the case where an aqueous solution or slurry of calcium hypochlorite is employed as the protective coating, it is preferred to employ a slurry of calcium hypochlorite which forms a protective coating containing less than about 65 percent by weight of available chlorine, and preferably from about 10 to about 50 percent available chlorine. A suitable coating composition is the filtrate from calcium hypochlorite filter 10, which contains from about 8 to about 12 percent by weight of calcium hypochlorite and from about 18 to about 25 percent by weight of sodium chloride.

An aqueous solution of sodium chloride is also a preferred coating composition, particularly when admixed with lime in a proportion of up to about a 4:1 weight ratio. The salt coating, particularly when admixed with lime, provides an alkaline barrier which permits the application of a second coating from second coating feed line 119 or spray feed line 88. In this case, the second coating may be slightly acidic, such as aluminum sulfate without reaction with calcium hypochlorite because of the protective salt barrier.

In another embodiment of the invention, coating of the dried calcium hypochlorite particles, either those prepared in spray grainer 18, fluidized bed apparatus 130, second spray grainer 89 or calcium hypochlorite particles prepared by conventional techniques can be coated in rotary dryer 68 by spraying a concentrated solution, a slurry or a melt of of the inorganic salt through spray nozzle 87 in the cooling end of rotary dryer 68. The water applied to the product in this case should be equal or less than that to be retained in the final product (usually 0.5 percent to about 10 percent) since subsequent drying is not desirable. Where the amount of water is in excess of about 10 percent by weight, the coating solutions, slurries, or melts are applied before final drying as described above in second spray grainer 89. Nevertheless, calcium hypochlorite particles discharged from rotary dryer 68 through product line 86 may be conveyed to an additional dryer such as rotary dryer 68 or a conventional shelf dryer, if it is desired to reduce the moisture content of the resulting coated calcium hypochlorite product. Coating of calcium hypochlorite in the cooling end of rotary dryer 68 is preferred when hydrated low melting salts which are molten at temperatures below about 150° C., and which are solid at temperatures below about 40° C., of the type listed above, are employed as the coating composition. It is preferred to employ molten salts such as sodium tetraborate, aluminum sulfate, magnesium sulfate and various hydrates thereof as a coating material. When molten salts of this type are employed, it is only necessary to heat the hydrated salts until they are in molten condition and then spray droplets of the molten composition onto the calcium hypochlorite particles at the lower temperatures in the cooling end of the dryer. Solidification of an encapsulating layer of the hydrated salt on the surface of the calcium hypochlorite is effected without the need for evaporation of water. Moisture transfer from the hydrated molten salt to the underlying dehydrated hypochlorite is thereby minimized or prevented. The resulting solid layer of inorganic salt forms a protective coating on the calcium hypochlorite and not only provides stability for the available chlorine content during extended storage and contact with elevated temperature conditions, but also provides improved thermal stability when contacted with burning matches, burning cigarettes, or reactive chemicals such as isopropanol, glycerine, and products containing them.

Generally, the coated calcium hypochlorite particles produced by spraying in either spray grainer 89 or rotary dryer 68, after drying, have a particle size which ranges from about −4 mesh to about +4 mesh, and preferably from about −10 mesh to about +30 mesh. The coated calcium hypochlorite particles thus produced generally contain a protective layer or layers, as the case may be, of inorganic salt which comprises from about 5 to about 40 percent by weight, and preferably from about 5 to about 15 percent by weight of the granule. The average available chlorine content of the entire granule generally ranges from about 50 to about 85 percent by weight (dry basis) and the average water content ranges from about 0.5 to about 10, and preferably from about 1 to about 8. However, because of the heterogeneous nature of the exterior layer, the coated calcium hypochlorite particles are more stable to thermal decomposition and loss of available chlorine.

The term "rounded" used to characterize the novel calcium hypochlorite particles of this invention is intended to cover particles which are substantially spherical in shape, but which may exhibit "egg-shape" distortion also. Irregular particles have a maximum diameter and a minimum diameter. The ratio of the maximum diameter to the minimum diameter of irregular particles of calcium hypochlorite produced by crushing in conventional commercial processes is generally greater than about 2:1. In contrast, the novel rounded calcium hypochlorite particles of this invention approach a spherical shape and generally have a ratio of maximum diameter to minimum diameter of about 1.5:1 or less.

A further difference between the novel rounded particles of this invention and the irregular shaped conventional particles is that the outer surfaces of the rounded particles of this invention are substantially smooth undisturbed layers of calcium hypochlorite or inorganic salt which are formed by depositing the slurry and drying it under constant agitation to remove the water component of the slurry. In contrast, the irregular shaped calcium hypochlorite particles of commerce have been formed by compressing wet filter cake between compression rollers to form a sheet-like material, and then fracturing the sheet into irregular shaped platlets which are subsequently dried under quiescient conditions. Because of the unique procedure for preparing the novel rounded compositions of this invention, there is a markely improved resistance to dusting and physical breakdown.

Figure 5:

FIG. 5 shows the irregular shaped rough surfaced calcium hypochlorite particles produced by fracturing compressed calcium hypochlorite cake in a conventional commercial process.

Figure 6:
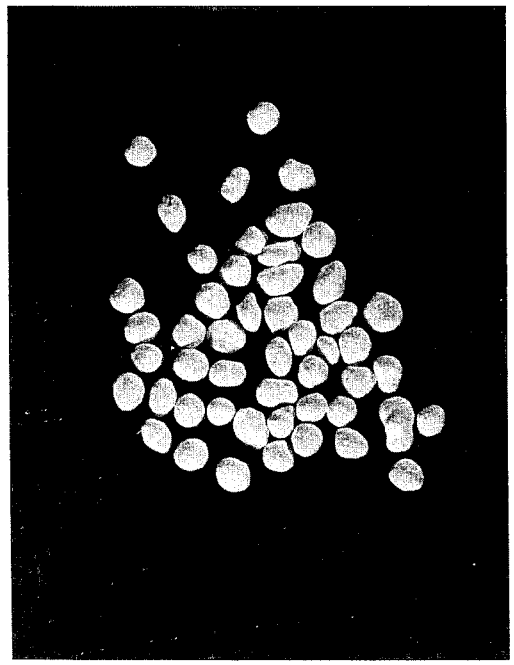

FIG. 6 shows the rounded smooth surfaced calcium hypochlorite particles of this invention produced by the paintlike effect of coating in spray grainer 18. FIGS. 5 and 6 are each photographs of calcium hypochlorite particles which have been magnified five times.

The following examples are presented to define Applicant's invention more clearly witout any intention of being limited thereby. All parts and percentages are by weight unless otherwise specified.

EXAMPLE I

A rotary spray grainer was constructed of a drum 10 inches in diameter and 12 inches long turning at 30 to 40 rpm. Access to the interior of the drum was through a 4 inch opening at one end. Attached to the walls were 4 radial flights 1 inch high. Drum axis was horizontal. Drum speed was set to produce cascading of the bed over about 50 percent of the cross-sectional area of the drum. Operation of the drum was batchwise.

The starting bed was 1.3 pounds of −20 +30 mesh calcium hypochlorite, a commercial product having the composition shown in Table I, column (1). Heat was supplied by an external gas burner impinging on the drum walls to maintain the bed temperature at about 60° C. (140° F.).

Feed was made up by diluting a calcium hypochlorite filter cake (from Eimco filer) having the composition shown in Table I, column (2). Water was added to make a slurry of creamy, pumpable consistency containing 50 percent water and the analysis shown at Table I, column (3). The slurry was sprayed onto the cascading bed in the heated rotary spray grainer for a period of about 15 hours. A total bed weight of 4 to 5 pounds was required to develop the maximum heat transfer capability of the drum. Particle size control of material in the bed was by periodic screening of the bed. Over-size grain was crushed and returned as required to keep the seeding rate in balance with the production rate. After all the feed was introduced, the bed was heated with air at 90° C. (194° F.) for 10 minutes to dry the calcium hypochlorite particles and the product was removed and analyzed. Total production was 8.9 pounds of product containing 62.5 percent available chlorine and water content of about 5 percent. The production rate was 0.5 lb./hr. Bed retention time was about 300 minutes due to the low rate of heat transfer from the external heater source through the drum walls. The excessive loss of available chlorine is attributed to excessive retention time at too high a bed temperature.

Table I

| Composition of Materials in Percent by Weight | | | |
|---|---|---|---|
| Component | (1) Starting Bed | (2) Filter Cake | (3) Slurry Feed |
| Calcium hypochlorite | 72.0 | 45.43 | 41.50 |
| Calcium chloride | 0.5 | 0.44 | 0.42 |
| Calcium chlorate | 0.1 | 0.02 | 0.02 |
| Calcium hydroxide | 1.5 | 0.24 | 0.23 |
| Calcium carbonate | 1.0 | 0.44 | 0.42 |
| Sodium chloride | 24.0 | 7.75 | 7.41 |
| Water (Difference) | 0.9 | 45.68 | 50.00 |
| | 100.0 | 100.00 | 100.00 |

EXAMPLE II

In another run in the same equipment as used in Example I, using an initial bed of 3 pounds of commercial −16 mesh calcium hypochlorite, heat was introduced by means of an air stream at a temperature 150° C. (302° F.). The air volume maintained the bed at 45° to 50° C. (113° to 122° F.).

Slurry feed was prepared as before from a filter cake containing 37 percent calcium hypochlorite and 53 percent water. The resulting slurry was sprayed onto the cascading bed in the heated rotary spray grainer for 4 hours. Production rate was 1.3 lb./hr. The available chlorine content of the product was 70.4 percent and the loss of available chlorine in the process was acceptable. The lower loss of available chlorine is attributed to a shorter bed retention time and a lower bed operating temperature.

For purposes of comparison, the spray grainer of Example II was charged with a bed of 4 pounds of commercial −16 mesh calcium hypochlorite containing 69 percent available chlorine. The feed slurry of the same composition as used in Example I was sprayed on the cascading bed in the heated rotary spray grainer for 4 hours. Bed temperature was 70° to 75° C. (158° to 167° F.). Production rate was 2 lb./hr. for 4 hours. The product contained 55 percent available chlorine (dry basis). This batch operation for 4 hours at 70° to 75° C. (158° to 167° F.) resulted in a lower available chlorine product due to excessive retention time at too high a temperature.

EXAMPLE III

In another run in the same equipment as used in Example I, 7 pounds of calcium hypochlorite were grained at 43° C. (109.4° F.) from slurry feed containing 55 percent water, 35 percent calcium hypochlorite and 10 percent of inert salts. Production rate was 1.5 lbs./hr. The starting bed was 4 pounds of commercial granular hypochlorite containing 70 percent available chlorine. The product as grained contained 20 percent of moisture including water of hydration. Five pounds of the hydrated grain was dehydrated in the same drum in 50 minutes by exposure to a 150° C. (302° F.) air stream. Heat input to the drum was electrically heated hot air from an 800 watt source. The weight of anhydrous product recovered was 4 pounds. Calcium hypochlorite content of the product was 72 percent with 2 percent moisture. Loss of product by dusting was negligible. Approximate bed retention time of the starting bed was 120 minutes.

EXAMPLE IV

In another run in the same equipment as used in Example I, 11 pounds of calcium hypochlorite was grained at 50° C. (122° F.) from slurry feed containing 55 percent water, 35 percent calcium hypochlorite and 10 percent inert salts. Production rate was 3.0 lbs./hr. The starting bed was 4 pounds of commercial granular hypochlorite containing 70 percent available chlorine. The product as grained contained 20 percent of moisture including water of hydration. Five pounds of the hydrated grain was dehydrated in the same drum in 35 minutes by exposure to a 200° C. (392° F.) air stream. Heat input to the drum was electrically heated hot air from a 1500 watt source. The weight of anhydrous product recovered was four pounds. Loss of product by dusting was negligible. Calcium hypochlorite content of the product was 72.4 percent with 1.4 percent moisture. Approximate bed retention time of the starting bed was 100 minutes.

EXAMPLES V-VI

Grained and dehydrated products from Examples III and IV were stored for 2 hours at 100° C. (212° F.) equivalent to 1 year at ambient temperatures. The available chlorine loss was 0.27 percent in each instance.

Under humid conditions at 35° C. (95° F.) and 95 percent relative humidity for 16 weeks, the loss of available chlorine content was 6.4 percent, comparing favorably with a 6.22 percent loss for commercial, granular calcium hypochlorite under the same conditions.

EXAMPLE VII

Calcium hypochlorite was grained continuously in a drum 3 feet in diameter and 6 feet long rotated at 18 to 20 rpm provided with 16 radial flights 1 inch high positioned equidistant from each other around the interior of the drum. Steam heated air at 150° C. (302° F.) was injected at 800 cubic feet per minute. Feed slurry containing 35 percent calcium hypochlorite, 55 percent water and 10 percent inert salts was sprayed onto the cascading bed in the rotating drum at a rage equivalent to 100 lbs./hr. of dry anhydrous product. Moisture in the bed was 15 to 22 percent during graining. The bed was continuously recycled over a screen at a rate of 50 lbs./min. to isolate particles from the bed in excess of 20 mesh screen size. Grained product recovered contained 50 percent calcium hypochlorite and 21 percent water and was recovered at a rate of 127 lbs./hr. The bed retention time was 75 minutes. The hydrated grain was charged at a rate of 500 lb./hr. to a 3-foot diameter drying drum supplied with 800 CFM of air at 177° C. (350° F.). Anhydrous product containing 1 percent of residual moisture and about 70 percent calcium hypochlorite (dry basis) was recovered at a rate of 400 lb./hr. The bed temperature at the dryer discharge end was 74° C. (165° F.). The bed retention time in the dryer was 20 minutes.

EXAMPLE VIII

In a spray grainer of Example VII with a drum diameter of 3 feet and a drum length of 6 feet, the bed charge was 140 pounds of −30 +70 mesh particles commercial calcium hypochlorite. Drum speed was 18 to 22 rpm. Initial drum slope from the feed end was about 0.1 inch/ft. Operation was continuous.

The air stream produced some dusting of the originally charged particles which subsided quickly as the feed spray started and began to hydrate the bed. The air pressure was adjusted to produce uniform droplets of spray.

When the bed weight built up to 160 pounds, the drum slope was increased to 0.2 inch/ft. At this slope, the recycle was adequate to accept the maximum feed rate from the spray head which was equivalent to about 50 pounds of dry granular calcium hypochlorite per hour. A batch of feed from about 320 pounds of wet cake was sprayed onto the warm bed at a rate equivalent to 50 pounds per hour of dry product for about 3 hours. Bed temperature was maintained at 55° to 60° C. (131° to 140° F.) to maintain a water evaporation rate in balance with the slurry feed rate. Available chlorine in the bed and product was 73 to 74 percent (dry basis). With an increased recycle rate, and a 50-pound per hour feed rate the bed temperature declined to 50° C. (122° F.) which resulted in an available chlorine content of the bed and product in excess of 75 percent (dry basis).

EXAMPLE IX

In apparatus as shown in FIG. 1, a diluted slurry of calcium hypochlorite filter cake from an Eimco filter containing 40 percent of calcium hypochlorite, 10 percent sodium chloride and normal impurities and 50 percent water was charged at a temperature of 25° C. (77° F.) to a 10 × 30-foot spray grainer at a rate of 4,000 lb./hr. The interior was fitted with 24 radial flights 6 inches high positioned equidistant from each other around the interior of the spray grainer. Air was introduced into spray heads on branches in the slurry line at intervals to distribute the feed in the spray grainer. A recycle stream of partially dried calcium hypochlorite pellets amounting to 60,000 lb./hr. (53 percent calcium hypochlorite, 22 percent solid diluents and 25 percent water) was also charged to the spray grainer. The spray grainer and contents were heated to a temperature of 50° C. (122° F.) by a stream of 20,000 cu. ft./min. of stream heated air at 149° C. (300° F.). The spray grainer rotated at 10 rpm. Approximately one half of the recycle stream was screened. A stream of pelletized product of desired size (−16+30) was removed from the screens and charged to the dehydrator (rotary dryer) at the rate of 2670 lbs./hr. Retention time of the bed in the grainer was about 40 minutes. The charged pellets has the same composition as the recycled stream. The dehydrator and contents were heated to 80° C. (176° F.) by hot air in the heating part of the dehydrator by introducing a stream of 7,000 cu. ft./min. at a temperature of 175° C. (347° F.). Retention time in the rotary dryer was 15 minutes. Cooling air at a temperature of 30° C. (86° F.) was drawn into the cooling part (discharge end) of the dehydrator at a rate of about 2,000 cu. ft./min. The combined air streams withdrawn from the spray grainer and from the dehydrator amounting to 29,000 cu. ft./min. were drawn through a dry cyclone dust collector. Dust collected at the rate of 200 lb./hr. was pulverized and recycled to the feed end of the spray graining drum. Residual dust was trapped in a water scrubber. The air was discharged and water contining dissolved calcium hypochlorite was purged from the scrubber and used in making up fresh calcium hypochlorite slurry.

The product was pelletized calcium hypochlorite containing 70 percent available chlorine and having mesh sizes of −16+30 mesh, U.S. standard screens. It was dust free and dissolved readily in water.

EXAMPLE X

Calcium hypochlorite filter cake produced by the direct paste procedure described in U.S. patent application Ser. No. 340,121, filed Mar. 12, 1973, now U.S. Pat. No. 3,895,099, which issued July 19, 1975 containing 83 percent available chlorine (dry basis) was slurried with water to make a paste consisting of 45 percent total solids and 55 percent water. This was dispersed by spraying onto a cascading seed bed in a rotary drum 3 feet in diameter and 6 feet long having 16 radial lifters 1 inch high positioned equidistant from each other on the interior of the drum, turning at 20 rpm. The seed bed was calcium hypochlorite with a size range of −24 +40 mesh. The slurry was sprayed onto the cascading seed bed at the rate of 222 lb./hr. Air heated to 121° C. (250° F.) was admitted to the rotating drum at the rate of 800 standard cubic feet per minute. The bed temperature was maintained at 52° C. (125° F.). Water was evaporated at the rate of 100 lb./hr. to produce spray-grained calcium hypochlorite with 2 moles of water of hydration in the size range −20 +30 mesh at a rate of 122 lb./hr. The available chlorine content of the recovered grain was 81 percent. Retention time of the bed in the drum was 60 minutes.

The recovered grain in the size range −20 +30 mesh was used to form a seed bed of 160 lbs. in the drum described above. Filtrate from the calcium hypochlorite filter, containing 30 percent total solids and 70 percent water, with 35 percent available chlorine in the solids, was sprayed onto the seed bed at a rate of 130 lb./hr. until the bed weight was 200 lbs. The average available chlorine content of the resulting two-layer product was 68 percent.

The 200 pound bed was then exposed to 177° C. (350° F.) air for 15 minutes in the same 3 foot diameter drum to volatize the water of hydration. The bed temperature remained at 74° C. (165° F.) until the residual moisture in the grain was reduced to 1 percent.

EXAMPLE XI

A bed of 200 lbs. of the undried two-layer product prepared as described in Example X was exposed to 177° C. (350° F.) air for 10 minutes in the 3 foot diameter drum to volatilize water of hydration. The bed temperature remained at 74° C. (165° F.). Residual moisture remaining after 10 minutes of dehydration was 6 percent.

EXAMPLE XII

The procedure of Example X was repeated to form a bed of dried two-layer product containing 1 percent of residual moisture. It was cooled from 74° C. to 38° C. (165° F. to 100° F.) by the passage of air at 27° C. (80° F.) for 5 minutes. The cooled anhydrous product was treated by spraying onto the cascading bed in the rotating drum a solution of 1 lb. of a polyacrylic acid sold commercially under the trademark "Calnox" in 5 lbs. of water. Moisture in the final product without further drying was 4 percent and polyacrylic acid content was 0.6 percent.

Other products coated with polyacrylic acid or its alkali metal salts were similarly prepared containing 0.6, 2.2, 2.7, 3.5, 4.9 and 6.1 percent water. Available chlorine contents were 62.1 to 67.8 percent.

EXAMPLE XIII

A fluidized bed was maintained in a cylindrical tower 12 inches in diameter and 24 inches high. At the bottom of the tower, the cross-section was reduced to a 6-inch circular opening by a frustoconical transition section 16 inches high. Heated air at 93° C. (200° F.) was injected at a rate of 60 cubic feet per minute through a diffuser grid located in the 6-inch opening to prevent the flow of solids back into the gas line. Seed was fed into the tower to sustain a level 8 inches from the top of the 12-inch section. Calcium hypochlorite slurry containing 45 percent solids and 55 percent water was sprayed onto the upper surface at a rate of 8 pounds per hour. The upper surface was in active motion by virtue of its support on the fluidized bed of seed contained in the tower. Seed was added at the rate of 1.2 lb./hr. Product was withdrawn at the rate of 4.8 lb./hr. to maintain a fixed upper level in the fluidization tower. The solid in the feed added through the sprays contained 82 percent available chlorine. The calcium hypochlorite product recovered contained 74 percent available chlorine. Grained calcium hypochlorite was withdrawn from the tower at 74° C. (165° F.). It contained 10 percent moisture.

EXAMPLE XIV

The graining drum as described in Example I was loaded with 4 pounds of spray grained calcium hypochlorite with granule sizes ranging from 16- to 24-mesh. The material contained 25 percent moisture and 60 percent available chlorine. A NaCl slurry of pulverized NaCl suspended in saturated NaCl solution was sprayed onto the cascading bed in the drum until the bed weight had increased to 5 pounds. Simultaneously heated air at 200° C. was injected. The bed temperature remained at 45° C. while the slurry was being sprayed. Slurry spray was then discontinued while additional hot air flow was sustained. The bed temperature increased to 73° C. and remained at this temperature level until the bed moisture had declined to 1 percent. Thereafter an increase in the bed temperature occurred. Drying was discontinued when the bed temperature reached 80° C. Bed moisture at this time was 0.7 percent. The recovered bed weighed 3.8 pounds. Weight loss was exclusively due to volatilization of bed moisture. The weight of NaCl used to encapsulate the calcium hypochlorite was 0.8 pounds. Particle size of the grain after coating ranged from −12 to +20 mesh. Available chlorine in the dried product was 63 percent. Encapsulated grain contacted with lighted matches and cigarettes failed to undergo thermal decomposition whereas uncoated grains decomposed completely under similar exposure. The loss rate of available chlorine from the encapsulated material was equivalent to that from unencapsulated material with the same moisture content.

EXAMPLE XV

The graining drum as described in Example I was loaded with 4 pounds of dehydrated spray grained calcium hypochlorite with an available chlorine content of 79 percent and a moisture content of 1 percent. A hot concentrated slurry of basic $Al_2(SO_4)_3$ solution at 110° C. containing 45 percent water was sprayed onto the cool cascading bed in the drum until the weight of the bed had increased to 4.5 pounds. The alum encapsulated calcium hypochlorite contained 70 percent available chlorine and 6 percent water the bulk of which was retained in the outer alum coating. Loss rates of available chlorine during 2 months indicated equivalent storage stability for the dehydrated calcium hypochlorite and the alum encapsulated grain. The alum encapsulated hypochlorite was also completely stable on exposure to lighted cigarettes and chemical contaminants such as glycerine which sufficed to decompose the untreated hypochlorite.

EXAMPLE XVI

Four pounds of dehydrated spray grained calcium hypochlorite was coated with 0.5 pounds of a hot concentrated slurry of alkalized magnesium sulfate as described in Example XV for the alum coating. Available chlorine after coating was also 70 percent with 6 percent water. The 2-month storage stability was equivalent to that of the uncoated anhydrous calcium hypochlorite and the encapsulated product was also insensitive to decomposition by exposure to localized heat or chemical contaminants. After cooling the hot alkalized magnesium sulfate slurry froze onto the hypochlorite as the crystalline hydrate of the salt.

EXAMPLE XVII

The graining drum of Example VII which was 3 feet in diameter and 6 feet long turning at 20 RPM was loaded with 160 pounds of spray grained calcium hypochlorite containing 79 percent available chlorine and 1 percent water. This bed was coated simultaneously from two feed sprays making applications in approximately equal amounts of an acidic eutectic of molten borates containing 12 percent $Na_2O$; 45 percent $B_2O_5$; and 43 percent water, and an alkaline eutectic of molten borates containing 26 percent $Na_2O$; 35 percent $B_2O_3$; and 39 percent water. Neutralization of these two molten eutectics on the surface on the dehydrated and cool hypochlorite resulted in crystallization of the neutral, hydrated sodium tetraborate. Total coating weight applied was 20 pounds. The hypochlorite encapsulated in the hydrated borate was insensitive to decomposition by standard tests for thermal initiation or chemical contamination. This material exhibited storage stability equivalent to that of the dehydrated calcium hypochlorite.

EXAMPLE XVIII

The coating demonstration as described in Example XVII was repeated using an eutectic melt of sodium borate containing 22 percent $Na_2O$; 30 percent $B_2O_3$; and 48 percent water in one spray and a 50 percent solution of NaOH in a second spray. Both sprays were directed into the same position of the cascade and were operated simultaneously to form a hydrated metaborate crystal shell on the surface of the hypochlorite containing 25 percent $Na_2O$; 28 percent $B_2O_3$; and 47 percent water. Total coating applied to the 160 pound bed was 15 pounds. The encapsulated product contained 72 percent of available chlorine and 5 percent of water. The encapsulated product was insensitive to decomposition by standard tests for thermal initiation or chemical contamination and also exhibited long term storage stability equivalent to the uncoated dehydrated calcium hypochlorite.

EXAMPLE XIX

Four pounds of rounded spray grained calcium hypochlorite containing 25 percent moisture prepared as in Example VII in the spray grainer was dehydrated in the equipment described in Example I by contact with heated air at 180° C. for 15 minutes. The dehydration temperature remained at 73° C. until the bed moisture was 1 percent. The recovered product weighed 3.0 pounds which includes 0.03 pounds of moisture. Dust loss during drying was only 1 percent of the weight of the product recovered.

For purposes of comparison, the drying test of this example was repeated with 4 pounds of irregular sharp-edged flaky grain taken from the conventional calcium hypochlorite manufacturing operations. Dehydration was continued to 1 percent moisture. The recovered product was only 2.5 pounds. Dust loss during drying was 20 percent of the weight of the recovered product.

This comparison shows the high degree of integrity and resistance to dusting that is inherent in the novel rounded calcium hypochlorite particles of the invention which are not characteristic of prior art calcium hypochlorite product.

What is to be claimed and secured by letters patent is:

1. A method for preparing particulate solid calcium hypochlorite having a smooth rounded surface from a pumpable and sprayable aqueous slurry of calcium hypochlorite which comprises:

(a) maintaining in a rotary spray grainer a moving bed of particulate solid calcium hypochlorite containing from about 5 to about 30 percent by weight of water in the lower part of a distributing zone having an upper part and a lower part, (b) maintaining a temperature in said distributing zone in the range from about 40° to about 70° C., (c) lifting a portion of said moving bed to said upper part and releasing said particles to separately fall through said distributing zone to said bed, (d) spraying on said falling particles a pumpable and sprayable aqueous slurry of calcium hypochlorite containing from about 45 to about 90 percent by weight of water, (e) simultaneously evaporating and removing water from said slurry on said falling particles whereby said particles are coated with a layer of solid calcium hypochlorite, and the water content is from about 5 to about 30 percent by weight, and (f) removing at least a portion of the resulting coated rounded solid calcium hypochlorite particles from said distributing zone.

2. The method of claim 1 wherein said slurry contains from about 50 to about 60 percent by weight of water.

3. The method of claim 2 wherein said particles contain from about 15 to about 27 percent by weight of water.

4. The method of claim 3 wherein said temperature in said distributing zone is from about 45° to about 60° C.

5. The method of claim 1 wherein said coated solid calcium hypochlorite particles removed from said distributing zone are heated in a separate drying zone to further remove water therefrom.

6. The method of claim 5 wherein said further dried coated solid calcium hypochlorite particles contain from about 60 to about 83 percent calcium hypochlorite by weight and from about 0.1 to about 10 percent by weight of water.

7. The method of claim 4 wherein a stream of gas inert to calcium hypochlorite is passed through said distributing zone to remove water vapor from said distributing zone.

8. The method of claim 7 wherein said stream of gas has a temperature of from about 85° C. to about 250° C.

9. The method of claim 4 wherein heat is introduced into said distributing zone by maintaining a portion of said particles in contact with a heated surface.

10. The method of claim 4 wherein at least a portion of said particles removed from said distributing zone is classified into a product fraction, and over-size fraction and an under-size fraction, said under-size fraction is returned to said distributing zone, said over-size fraction is crushed and reclassified, and said product fraction is recovered.

11. The method of claim 5 wherein said particles in said drying zone are heated by passing a stream of gas inert to calcium hypochlorite through said drying zone, said drying zone being maintained at a temperature in the range from about 65° to about 100° C.

12. The method of claim 11 wherein a plurality of said distributing zones are maintained in series, said solid calcium hypochlorite from each of said distributing zones except the last is charged to the next distributing zone, spraying an aqueous slurry of calcium hypochlorite onto said particles in each of said distributing zones, and removing from the last of said distributing zones said solid calcium hypochlorite particles, and charging said particles from the last of said distributing zones to said drying zone.

* * * * *

UNITED STATES PATENT AND TRADEMARK OFFICE
CERTIFICATE OF CORRECTION

PATENT NO. : 4,118,524

DATED : October 3, 1978

INVENTOR(S) : Walter C. Saeman

It is certified that error appears in the above—identified patent and that said Letters Patent are hereby corrected as shown below:

On the title page, in [60], after "1974", delete "abandoned,".

On the title page, in the Abstract, second paragraph, lines 1, 3, and 7, after "coated" delete "articles" and insert --particles--.

In Column 1, line 5, after "Nov. 6, 1974" delete --now abandoned-

In Column 5, line 13, after "even" delete "through" and insert --though--.

In Column 9, line 3, delete "mixture" and insert --moisture--.

In Column 11, line 30, after "portion" (first occurrence) delete "89" and insert --98--.

In Column 12, line 25, after "builds" insert --up behind--.

In Column 21, line 13, after "+", delete "4" and insert --40--.

UNITED STATES PATENT AND TRADEMARK OFFICE
CERTIFICATE OF CORRECTION

PATENT NO. : 4,118,524
DATED : October 3, 1978
INVENTOR(S) : Walter C. Saeman

It is certified that error appears in the above-identified patent and that said Letters Patent are hereby corrected as shown below:

In Column 21, line 56, delete "markely" and insert --markedly--.

In Column 22, line 20, after "Eimco", delete "filer" and insert --filter--.

In Column 24, line 13, delete "rage" and insert --rate--.

In Column 25, line 10, delete "stream" and insert --steam--.

In Column 25, line 16, delete "has" and insert --had--.

Signed and Sealed this

Thirteenth Day of March 1979

[SEAL]

Attest:

RUTH C. MASON
Attesting Officer

DONALD W. BANNER
Commissioner of Patents and Trademarks